(12) United States Patent
Scott

(10) Patent No.: US 7,237,768 B1
(45) Date of Patent: Jul. 3, 2007

(54) LIQUID FUEL AND GAS ATOMIZATION AND DISPERSION SYSTEM

(76) Inventor: David Scott, 7344 Isle Dr., Port Richey, FL (US) 34668

(*) Notice: Subject to any disclaimer, the term of this patent is extended or adjusted under 35 U.S.C. 154(b) by 250 days.

(21) Appl. No.: 10/903,392

(22) Filed: Jul. 30, 2004

(51) Int. Cl.
*F02M 29/06* (2006.01)

(52) U.S. Cl. .................. 261/79.1; 123/298; 123/306; 261/79.2

(58) Field of Classification Search ............... 261/79.1, 261/79.2, 78.1, 78.2; 123/298, 306
See application file for complete search history.

(56) References Cited

U.S. PATENT DOCUMENTS

| | | | | | |
|---|---|---|---|---|---|
| 3,336,017 | A | * | 8/1967 | Kopa | 261/128 |
| 3,414,242 | A | * | 12/1968 | Bouteleux | 261/18.3 |
| 3,875,266 | A | * | 4/1975 | Fonagy | 261/50.2 |
| 4,092,966 | A | * | 6/1978 | Prosen | 48/189.4 |
| 4,130,099 | A | * | 12/1978 | Ferguson | 123/590 |
| 4,177,780 | A | * | 12/1979 | Pellerin | 123/590 |
| 4,183,332 | A | * | 1/1980 | Hofbauer et al. | 123/184.42 |
| 4,270,508 | A | * | 6/1981 | Lindberg | 123/25 A |
| 4,307,697 | A | * | 12/1981 | Ong | 48/189.4 |
| 6,073,609 | A | * | 6/2000 | Buswell et al. | 123/306 |
| 6,330,825 | B1 | * | 12/2001 | Harness et al. | 73/118.1 |
| 6,736,376 | B1 | * | 5/2004 | DeLisle | 261/79.1 |
| 2003/0155666 | A1 | * | 8/2003 | Amou et al. | 261/79.1 |
| 2003/0234455 | A1 | * | 12/2003 | Mieney et al. | 261/76 |

FOREIGN PATENT DOCUMENTS

JP 2-215921 * 8/1990 .................. 123/306

* cited by examiner

*Primary Examiner*—Richard L. Chiesa
(74) *Attorney, Agent, or Firm*—Edward P. Dutkiewicz

(57) ABSTRACT

A fuel injector is coupled to a fuel source. A vortex generator is coupled with the injector and a gas source and has a passageway there through. A portion of the passageway has a generally tapered configuration. At least one manifold tube has a generally hollow tubular configuration. A throttle body is coupled with the manifold tubes. A head adapter has a plurality of holes there through. The holes are located and configured to mate with the intake ports of the head of an internal combustion engine. The head adapter is configured to couple the throttle body to the internal combustion engine head.

8 Claims, 5 Drawing Sheets

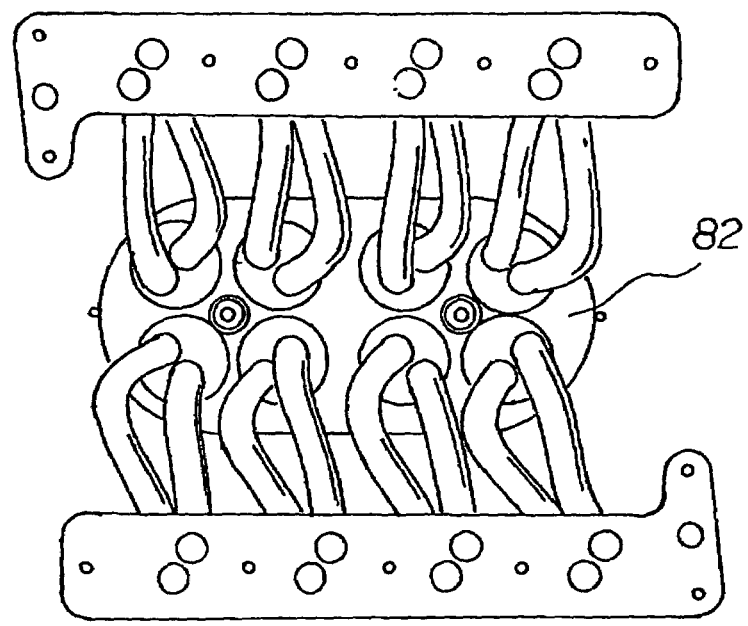
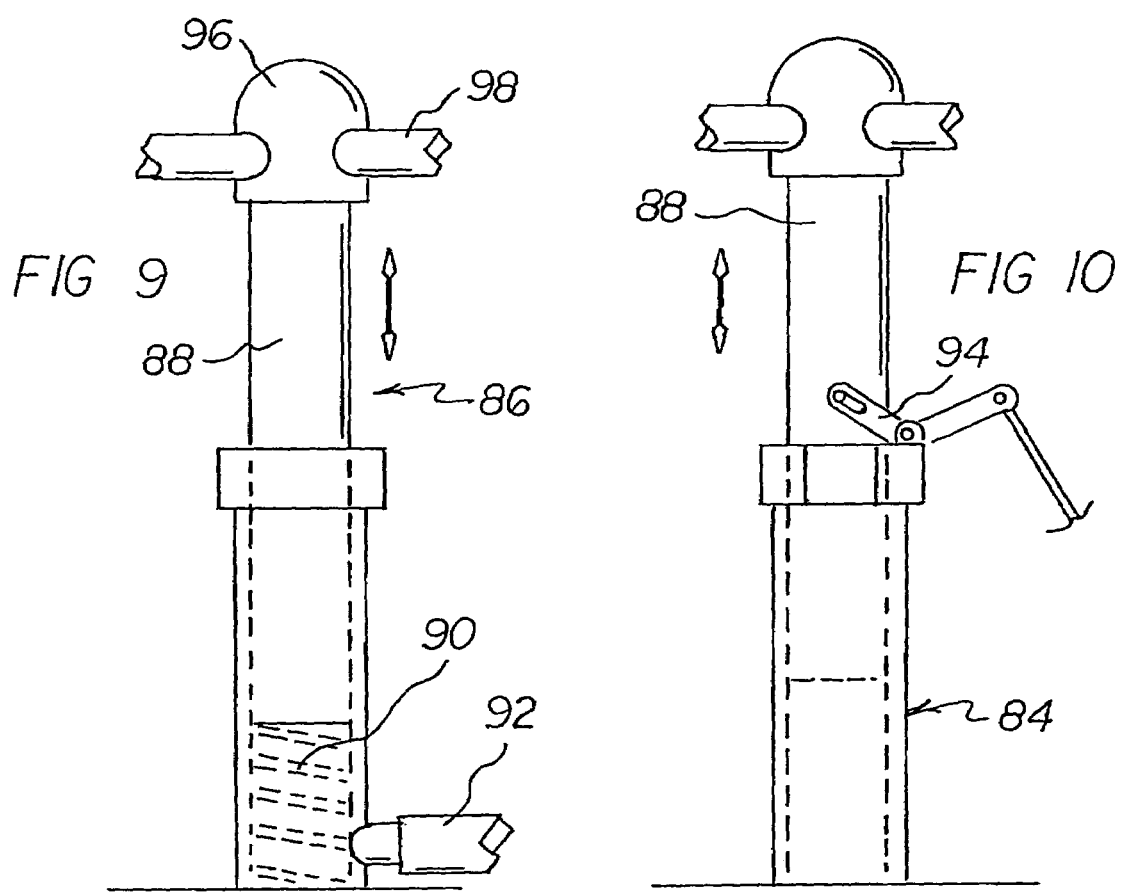
FIG 8
FIG 9
FIG 10

LIQUID FUEL AND GAS ATOMIZATION AND DISPERSION SYSTEM

BACKGROUND OF THE INVENTION

1. Field of the Invention

The present invention relates to a liquid fuel and gas atomization and dispersion system and more particularly pertains to allowing the efficient fuel combustion within an internal combustion engine.

2. Description of the Prior Art

The use of combustion engines of known designs and configurations is known in the prior art. More specifically, combustion engines of known designs and configurations previously devised and utilized for the purpose of fuel combustion through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,183,332 issued Jan. 15, 1980 to Hofbailer et al relates to an intake system. U.S. Pat. No. 4,270,508 issued Jun. 2, 1981 to Lindberg relates to a combustion control system. Lastly, U.S. Pat. No. 6,330,825 issued Dec. 18, 2001 to Harness relates to an internal combustion engine fuel management system.

While these devices fulfill their respective, particular objectives and requirements, the aforementioned patents do not describe liquid fuel and gas atomization and dispersion system that allows the efficient fuel combustion within an internal combustion engine.

In this respect, the liquid fuel and gas atomization and dispersion system according to the present invention substantially departs from the conventional concepts and designs of the prior art, and in doing so provides an apparatus primarily developed for the purpose of allowing the efficient fuel combustion within an internal combustion engine.

Therefore, it can be appreciated that there exists a continuing need for a new and improved liquid fuel and gas atomization and dispersion system which can be used for allowing the efficient fuel combustion within an internal combustion engine. In this regard, the present invention substantially fulfills this need.

SUMMARY OF THE INVENTION

In view of the foregoing disadvantages inherent in the known types of combustion engines of known designs and configurations now present in the prior art, the present invention provides an improved liquid fuel and gas atomization and dispersion system. As such, the general purpose of the present invention, which will be described subsequently in greater detail, is to provide a new and improved liquid fuel and gas atomization and dispersion system and method which has all the advantages of the prior art and none of the disadvantages.

To attain this, the present invention essentially comprises an internal combustion engine. The internal combustion engine has at least one head. The head has at least one intake port and a fuel source. The fuel source is also known as an injectate source. The head also has a gas source such as ambient air.

A fuel injector is provided. The injector is operatively coupled to the fuel source.

Provided next is a vortex generator. The vortex generator is coupled with the injector. In this manner the injectate is allowed to pass through the vortex generator. The vortex generator has an upper portion and a lower portion. The upper portion has an upper end. The lower portion 36 has a lower end. The upper portion has a generally tubular configuration. The upper portion has a first internal diameter with a side wall and a passageway there through. The lower portion of the vortex generator has a plurality of like-configured passageways there through. Each lower portion passageway has an upper extent and a lower extent. Each passageway has a generally tapered configuration. The taper has a second internal diameter on the upper end of the lower portion passageway. The taper also has a third internal diameter on the lower end of the lower portion passageway. The second internal diameter is smaller than the first internal diameter and larger than the third internal diameter. Each lower portion passageway has a plurality of raised lands. The raised lands are in a spiraling, circular, rifled configuration.

A plurality of tuned manifold tubes is provided next. Each tube has a generally hollow tubular configuration. Each tube has an upper region and a lower region. The upper region is configured to mate with the passageway of the lower extent of the vortex generator. The lower region of the manifold tube has a flange.

Further provided is a throttle body. The throttle body is coupled with the manifold tubes.

Provided last is a head adapter. The head adapter has a plurality of holes there through. The holes are located and configured to mate with the intake ports of the head of an internal combustion engine. The head adapter is configured to couple the throttle body to the internal combustion engine head.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved liquid fuel and gas atomization and dispersion system which has all of the advantages of the prior art combustion engines of known designs and configurations and none of the disadvantages.

It is another object of the present invention to provide a new and improved liquid fuel and gas atomization and dispersion system which may be easily and efficiently manufactured and marketed.

It is further object of the present invention to provide a new and improved liquid fuel and gas atomization and dispersion system which is of durable and reliable constructions.

An even further object of the present invention is to provide a new and improved liquid fuel and gas atomization and dispersion system which is susceptible of a low cost of manufacture with regard to both materials and labor, and which accordingly is then susceptible of low prices of sale to the consuming public, thereby making such liquid fuel and gas atomization and dispersion system economically available to the buying public.

Even still another object of the present invention is to provide a liquid fuel and gas atomization and dispersion system for allowing the efficient fuel combustion within an internal combustion engine.

Lastly, it is an object of the present invention to provide a new and improved liquid fuel and gas atomization and dispersion system. A fuel injector is coupled to a fuel source. A vortex generator is coupled with the injector and a gas source and has a passageway there through. A portion of the passageway has a generally tapered configuration. At least one manifold tube has a generally hollow tubular configuration. A throttle body is coupled with the manifold tubes. A head adapter has a plurality of holes there through. The holes are located and configured to mate with the intake ports of the head of an internal combustion engine. The head adapter is configured to couple the throttle body to the internal combustion engine head.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 8 is a bottom planar view taken along line 8—8 of FIG. 6.

FIG. 9 is a close up view of a pressure activated injector pod height adjustment mechanism.

FIG. 10 is a close up view of a mechanically activated injector pod height adjustment mechanism.

The same reference numerals refer to the same parts throughout the various Figures.

DESCRIPTION OF THE PREFERRED EMBODIMENT

Figure 1:
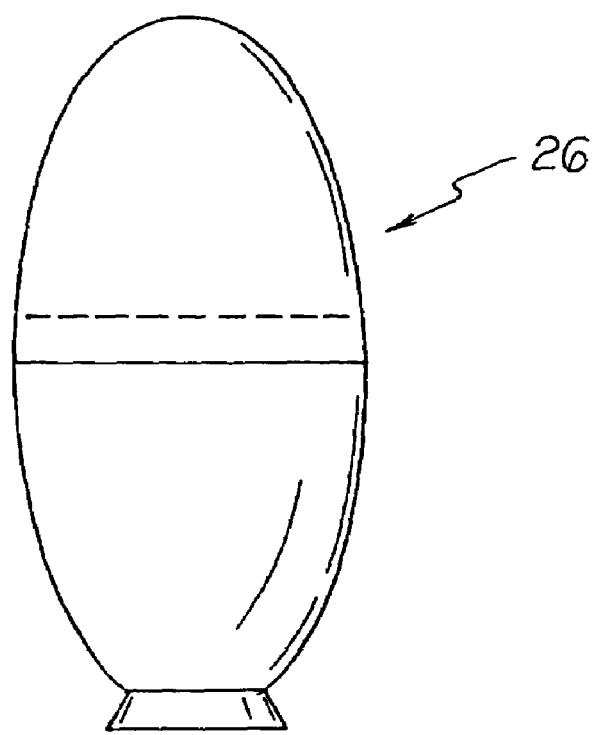
FIG. 1 is a front elevational view of fuel injector housing constructed in accordance with the principles of the present invention.
Figure 2:
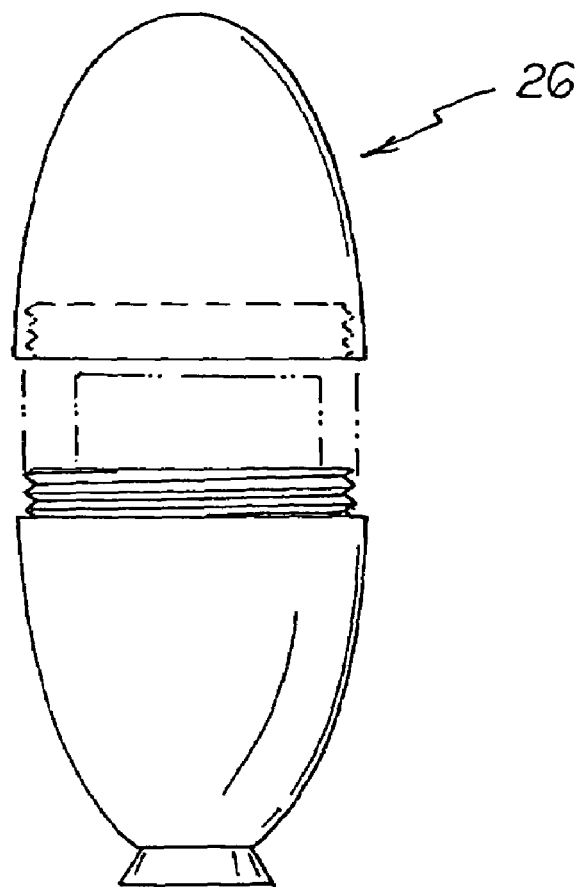
FIG. 2 is an exploded front elevational view of fuel injector housing shown in FIG. 1 as well as the fuel injector.
Figure 3:
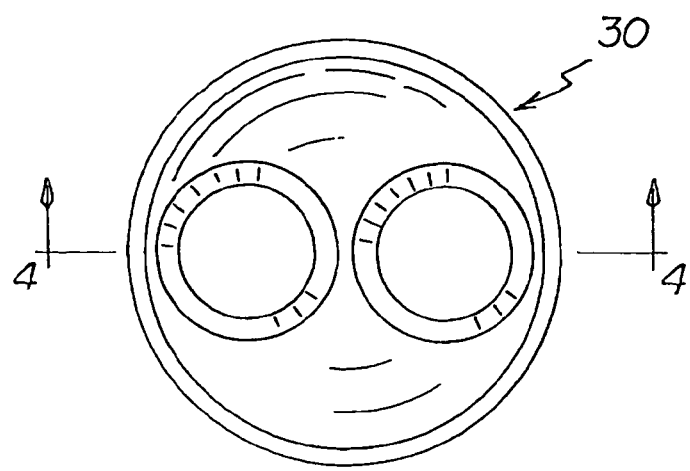
FIG. 3 is a plan view of the fuel injector as shown in FIG. 2.
Figure 4:
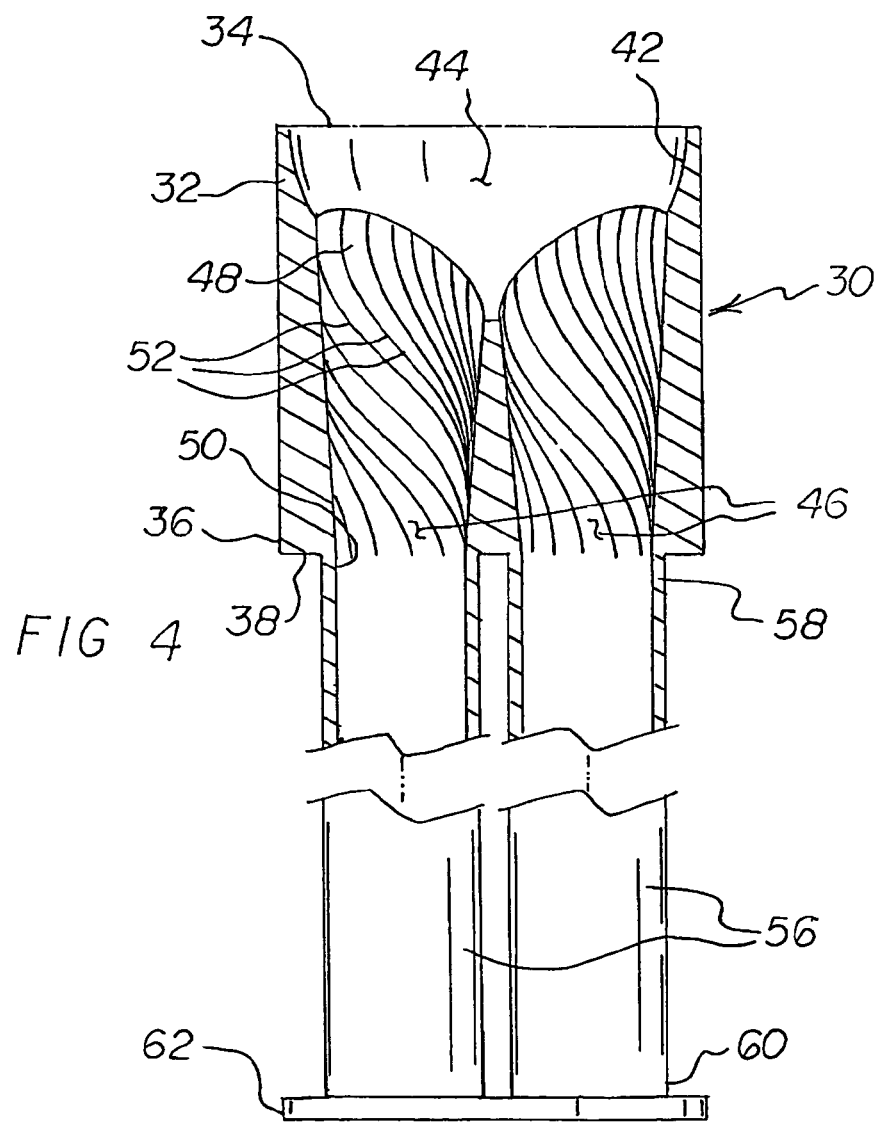
FIG. 4 is a cross sectional view taken along line 4—4 of FIG. 3.
Figure 5:
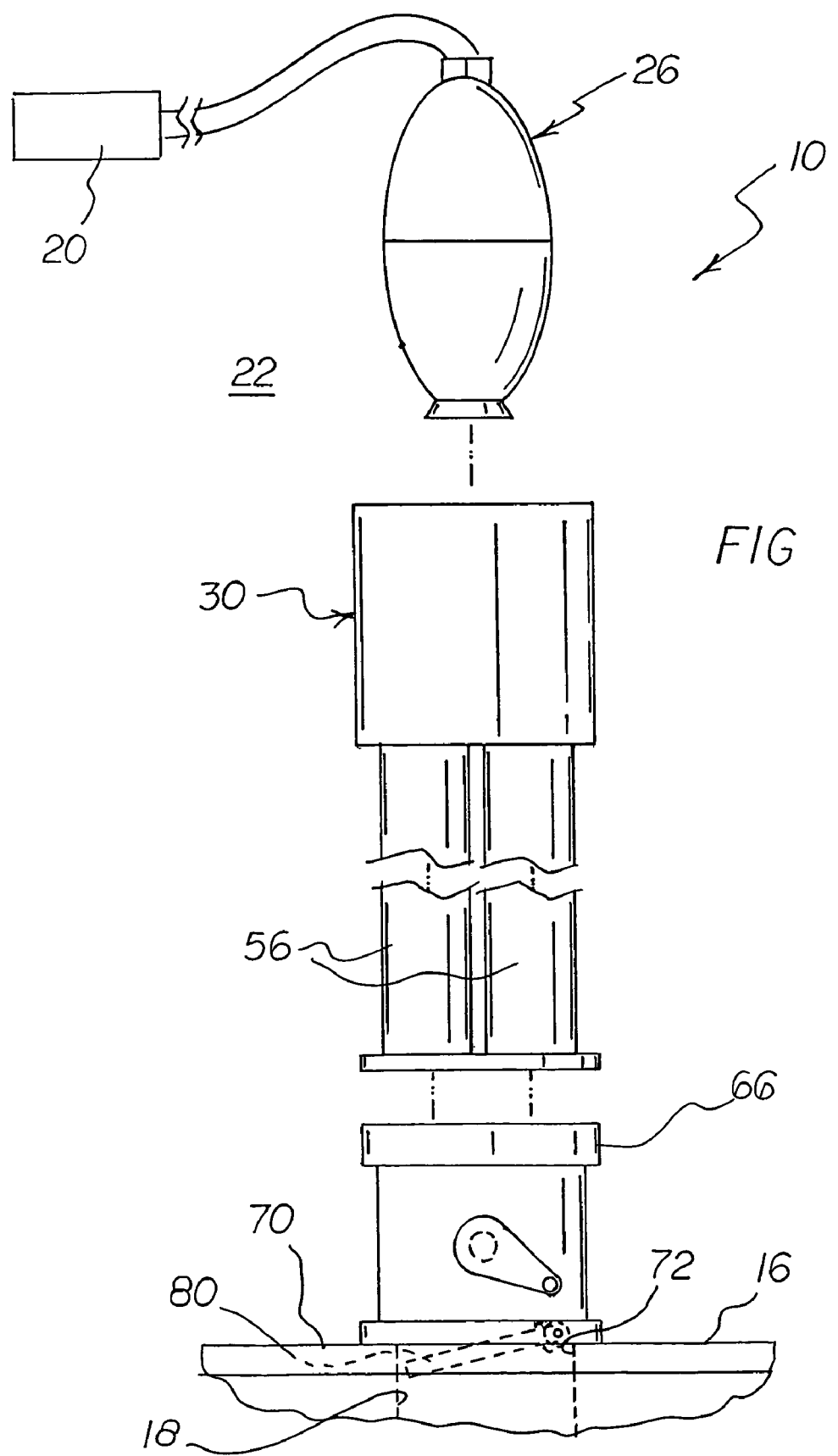
FIG. 5 is an exploded front elevational view of fuel injector housing above as shown in FIG. 1 as well as the throttle body and cylinder head below as well the fuel injector/air vortex housing/air cylinder there between as shown in FIGS. 2, 3 and 4.
Figure 6:
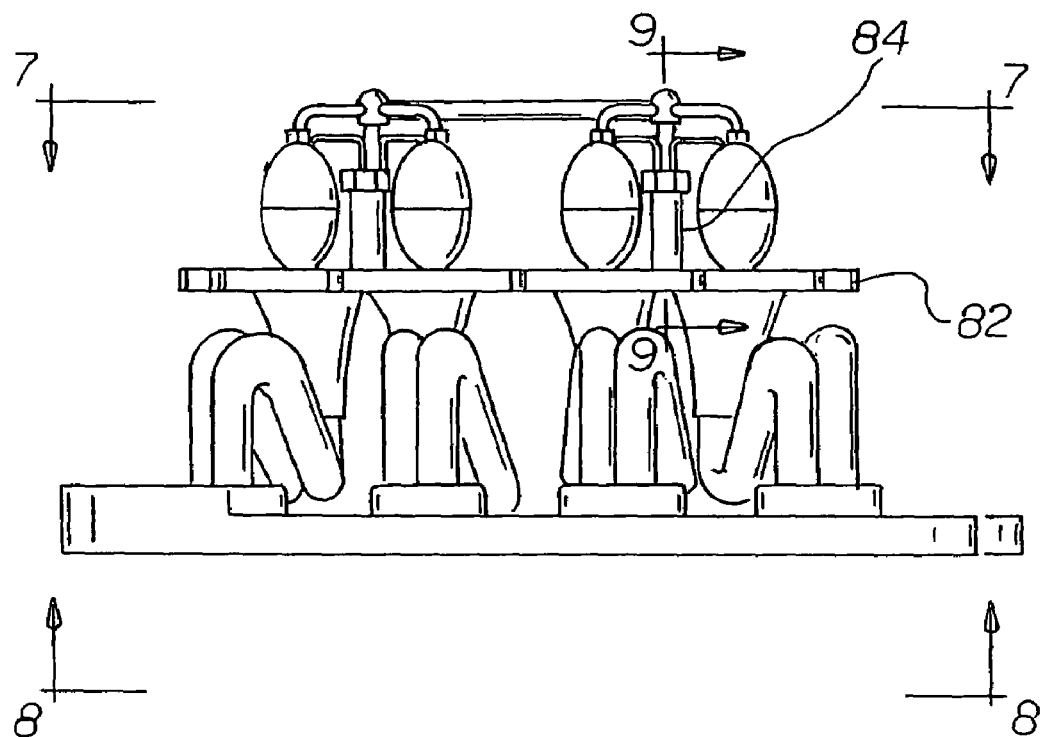
FIG. 6 is a side elevation view of the system, showing the assembled system.
Figure 7:
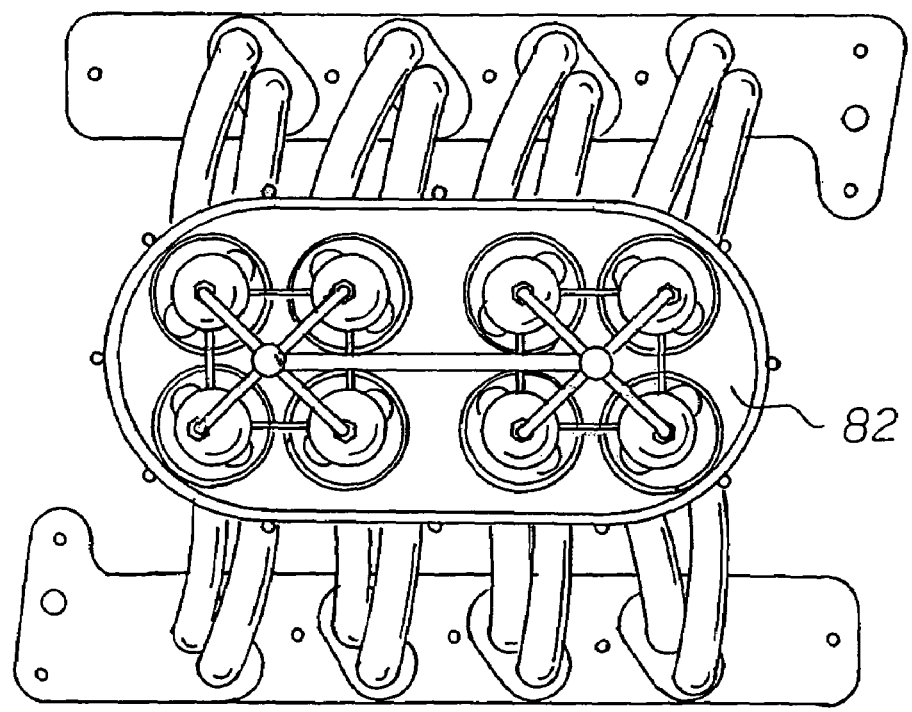
FIG. 7 is a top planar view taken along line 7—7 of FIG. 6.

With reference now to the drawings, and in particular to FIG. 1 thereof, the preferred embodiment of the new and improved liquid fuel and gas atomization and dispersion system embodying the principles and concepts of the present invention and generally designated by the reference numeral 10 will be described.

The present invention, the liquid fuel and gas atomization and dispersion system 10 is comprised of a plurality of components. Such components in their broadest context include a fuel source, a fuel injector, a vortex generator, at least one manifold tube, a throttle body and a head adapter. Such components are individually configured and correlated with respect to each other so as to attain the desired objective.

First provided is an internal combustion engine (not shown). The internal combustion engine has at least one head 16, with the head being operatively coupled to the engine. The head has at least one intake port 18 and the system has a fuel source 20. The fuel source is also known as an injectate source. The head also has a gas source 22 such as ambient air.

A fuel injector, also known as an injector pod, 26 is provided. The injector pod is operatively coupled to the fuel source.

Provided next is at least one vortex generator 30. The vortex generator is coupled with the injector. In this manner the injectate is allowed to pass through the vortex generator. The vortex generator has an upper portion 32 and a lower portion 36. The upper portion has an upper end 34. The lower portion 36 has a lower end 38. The upper portion has a generally tubular configuration. The upper portion has a first internal diameter with a side wall 42 and a passageway 44 there through. The lower portion of the vortex generator has a plurality of like-configured passageways 46 there through. Each lower portion passageway has an upper extent 48 and a lower extent 50. Each passageway has a generally tapered configuration. The taper has a second internal diameter on the upper end of the lower portion passageway. The taper also has a third internal diameter on the lower end of the lower portion passageway. The second internal diameter is smaller than the first internal diameter and larger than the third internal diameter. Each lower portion passageway has a plurality of raised lands 52. The raised lands are in a spiraling, circular, rifled configuration.

In an alternate configuration, the lower portion passageway of the vortex generator may have a smooth surface.

In another alternate configuration, the raised lands of the passageway may run along the length of the passageway, and not in a spiraled configuration.

A plurality of manifold tubes 56 is provided next. Each tube has a generally hollow tubular configuration. Each tube has an upper region 58 and a lower region 60. The upper region is configured to mate with the passageway of the lower extent of the vortex generator. The lower region of the manifold tube has a flange 62.

The manifold tube may be coupled to the vortex generator by any one of a plurality of coupling means, which include flange coupling, slip fit coupling, threaded coupling, press fit coupling, clip ring coupling and snap ring coupling.

In an alternate embodiment the manifold tubes may be tuned, that is, the manifold tubes may have an equal length and volume.

Further provided is a throttle body 66. The throttle body is coupled with the manifold tubes.

In an alternate embodiment the throttle body may have an air control valve 80. The air control valve provides a one way movement of air through the system. In one embodiment the air control valve may be located in close proximity with the throttle body.

In another alternate embodiment the air control valve may be located between the throttle body and the tubes.

Next provided is a head adapter 70. The head adapter has a plurality of holes 72 there through. The holes are located and configured to mate with the intake ports of the head of an internal combustion engine. The head adapter is configured to couple the throttle body to the internal combustion engine head.

In an alternate embodiment the throttle body may couple directly to the head without the use of a head adapter.

The system also comprises a means by which the injector pods may be moved in an in and out orientation relative to the top opening of the vortex generator, herein referred to as the air flow control means. The air flow control means comprises a base plate 82. The base plate has at least one mounting post 84. In the preferred embodiment the mounting post is configured as a set of telescoping cylinders 86. The upper, inner cylinder 88 is mated with the lower, outer cylinder. There is a biasing means 90, such as a spring, housed within the lower cylinder. There is a vacuum line 92 coupled to the lower cylinder.

In an alternate embodiment of the mounting post, the movement of the mounting post is mechanically controlled with the movement being effectuated by at least one lever 94.

In another alternate embodiment, the mounting post may be fixed and the injector pod location may be fixed in position in relation to the vortex generator. In this configuration the mounting post may be a non-telescoping tubular structure.

The air flow control means also comprises a pod coupler 96, with the pod coupler able to hold at least one injector pod. The pod coupler having at least one cross member 98 for coupling an injector pod to the pod coupler.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A liquid fuel and gas atomization and dispersion system for allowing the efficient fuel combustion within an internal combustion engine comprising, in combination:

an internal combustion engine having at least one head, the head having at least one intake port, and a fuel source, the fuel source also being known as an injectate source, and a gas source;

a fuel injector, the injector being operatively coupled to the fuel source;

a vortex generator, the vortex generator being coupled with the injector and allowing the injectate and a gas to pass through the vortex generator, with the vortex generator having an upper portion with an upper extent and end and a lower portion with a lower extent and end, with the upper and lower portions of the vortex generator being continuous with each other, the upper portion having a generally tubular configuration having a first internal diameter with a side wall and a passageway there through, the lower portion of the vortex generator having a plurality of like-configured passageways there through, with each lower portion passageway having an upper extent and a lower extent, each passageway having a generally tapered configuration with the taper having a second internal diameter on the upper extent of the lower portion passageway and a third internal diameter on the lower extent of the lower portion passageway, with the second internal diameter being smaller than the first internal diameter and larger than the third internal diameter, with each lower portion passageway having a plurality of raised lands in a spiraling, circular, rifled configuration;

a plurality of tuned manifold tubes with each tube having a generally hollow tubular configuration, with each tube having an upper region and a lower region, the upper region being configured to mate with the passageway of the lower end of the vortex generator and the lower region of the manifold tube having a flange;

a throttle body being coupled with the manifold tubes; and a head adapter, the head adapter having a plurality of holes there through, the holes located and configured to mate with the intake ports of the head of an internal combustion engine, the head adapter being configured to couple the throttle body to the internal combustion engine head.

2. A liquid fuel and gas atomization and dispersion system comprising:

a vortex generator having a passageway there through, the passageway having a portion having a generally tapered configuration;

at least one manifold tube having a generally hollow tubular configuration;

an air flow control means comprising a base plate having at least one mounting post comprising a set of telescoping cylinders with an upper, inner cylinder being mated with a lower, outer cylinder; and a biasing means operatively associated with the air flow control means.

3. The system as described in claim 2 wherein the mounting post is actuated by a mechanical means.

4. The system as described in claim 2 wherein the mounting post is actuated by a pressure means.

5. The system as described in claim 4 wherein the pressure means is a vacuum.

6. The system as described in claim 2 wherein the air flow control means also comprises a pod coupler having at least one injector pod coupled there to, the pod coupler having at least one cross member for coupling an injector pod to the pod coupler.

7. A liquid fuel and gas atomization and dispersion system comprising a vortex generator having a passageway there through, the passageway having a portion having a generally tapered configuration wherein the vortex generator has an upper portion with an upper end and a lower portion with a lower end, the upper portion having a passageway there through having a first internal diameter, and the lower portion having a passageway there through with the passageway having an upper extent having a second internal diameter and the lower extent of the lower portion passageway having a third internal diameter with the lower portion passageway having a generally tapered configuration.

8. The system as described in claim 7 wherein the second internal diameter is smaller than the first internal diameter and larger than the third internal diameter.

\* \* \* \* \*